United States Patent
Suzuki et al.

(10) Patent No.: US 6,590,333 B1
(45) Date of Patent: Jul. 8, 2003

(54) RARE EARTH PHOSPHO-VANADATE PHOSPHORS, DISPLAY SYSTEM AND LIGHT EMITTING SYSTEM

(75) Inventors: Teruki Suzuki, Funabashi (JP); Masatoshi Shiiki, Musashimurayama (JP); Choichiro Okazaki, Kodaira (JP); Tadashi Furukawa, Chiba (JP)

(73) Assignee: Hitachi, Ltd., Tokyo (JP)

( * ) Notice: Subject to any disclaimer, the term of this patent is extended or adjusted under 35 U.S.C. 154(b) by 329 days.

(21) Appl. No.: 09/675,211

(22) Filed: Sep. 29, 2000

(30) Foreign Application Priority Data

Oct. 1, 1999 (JP) .......................... 11-281077

(51) Int. Cl.[7] .................. H01J 17/49; H01J 1/67; C09K 11/56; C09K 11/79
(52) U.S. Cl. ................. 313/495; 313/486; 313/468; 313/582; 313/496; 252/301.4 P; 252/301.4 F; 252/301.6 F
(58) Field of Search ............... 252/301.4 P, 301.6 F, 252/301.4 F; 313/486, 582, 467, 468

(56) References Cited

U.S. PATENT DOCUMENTS

| | | | | |
|---|---|---|---|---|
| 3,668,455 A | * | 6/1972 | Dale et al. ................. 313/486 |
| 4,034,257 A | * | 7/1977 | Hoffman ..................... 313/487 |
| 4,041,319 A | * | 8/1977 | Fukuzawa et al. ........ 250/483.1 |
| 4,171,501 A | * | 10/1979 | Tanimizu et al. ........... 313/486 |
| 4,473,518 A | * | 9/1984 | Minagawa et al. ......... 264/667 |
| 5,399,197 A | * | 3/1995 | Vermoortele et al. ....... 106/479 |

FOREIGN PATENT DOCUMENTS

| | | | | |
|---|---|---|---|---|
| DE | 10011307 A1 | * | 9/2001 | ......... B01J/27/198 |
| JP | B 57-352 | | 10/1973 | |
| JP | B 57-353 | | 10/1973 | |

OTHER PUBLICATIONS

"Color PDP Technology and Materials," Technology & Materials of Color Plasma Display Panel, published by C.M.C., 1996, pp. 28–29.

* cited by examiner

Primary Examiner—Nimeshkumar D. Patel
Assistant Examiner—German Colón
(74) Attorney, Agent, or Firm—Mattingly, Stanger & Malur, P.C.

(57) ABSTRACT

Rare earth phospho-vandate phosphors containing at least one element of Group IV of the periodic table have spherical or cubic shaped particles and provide higher brightness and longer brightness life, and effective for use in display systems and light emitting systems.

20 Claims, 4 Drawing Sheets

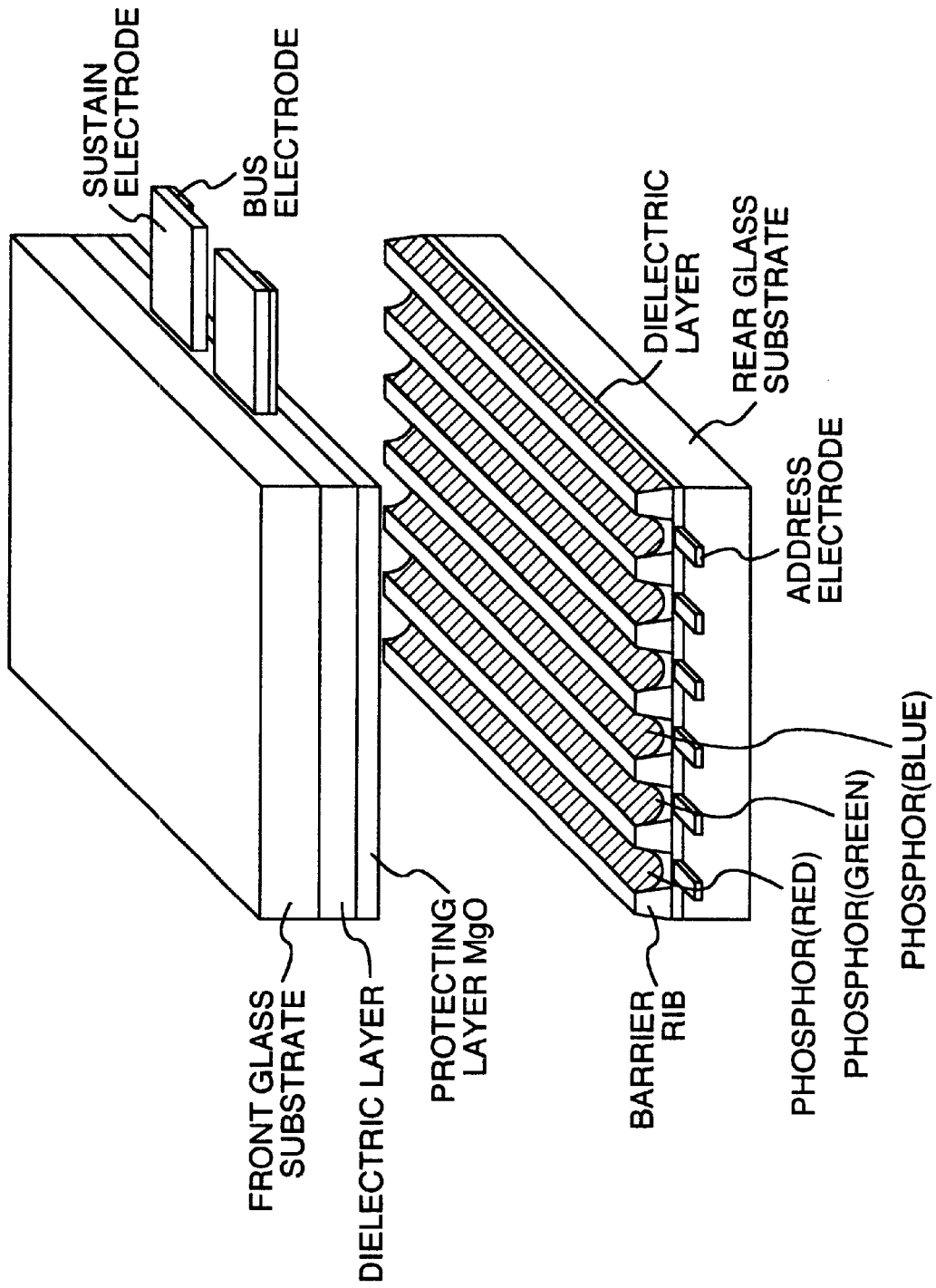

RARE EARTH PHOSPHO-VANADATE PHOSPHORS, DISPLAY SYSTEM AND LIGHT EMITTING SYSTEM

BACKGROUND OF THE INVENTION

This invention relates to display systems such as a plasma display apparatus used for broadcasting receivers, computer terminals or image displays, light emitting systems such as a rare gas discharge luminescent lamp, a deluxe luminescent lamp using a mixture of blue, green and red phosphors, and phosphors used therein.

Plasma displays applies a process wherein as an excitation source vacuum ultraviolet line which is generated in a negative glow region in minute discharge space containing a rare gas (in the case of using xenon as the rare gas, its resonance line residing in 147 nm) is used and phosphors placed in the discharge space is made to emit light necessary for color display. The structure of this gas discharge cell is disclosed, for example, in "Color PDP Technology and Materials" page 29 (1996, published by C.M.C.).

On the other hand, JP-B 57-352 and JP-B 57-353 disclose that phospho-vanadate phosphors containing rare earth elements as a major component are suitable as phosphors used in display systems such as a plasma display apparatus, and light emitting systems such as a rare gas discharge luminescent lamp, a deluxe luminescent lamp using a mixture of blue, green and red phosphors, etc.

Recently, performance of color plasma displays is improving year by year, but further improvement is still desired. As to phosphors, not only improvement of brightness in the form of powder but also improvement of brightness in the form of a plasma display panel (hereinafter referred to as "panel") are essential. In order to improve the brightness of the panel, the control of particle shape is essential. This is because higher density of a phosphor layer directly relates to the improvement of brightness of the panel. Particularly, the rare earth phospho-vanadate phosphors $Ln(P_cV_{1-c})O_4$ [Ln: rare earth element(s)] show a square pillar shape at the composition region showing the maximum brightness, that is, near the molar ratio of P (c) about 0.65. This is very disadvantageous, and improvement is desired.

BRIEF SUMMARY OF THE INVENTION

It is an object of the present invention to provide rare earth phospho-vanadate phosphors overcoming disadvantages of known rare earth phospho-vanadate phosphors, while maintaining high luminescent efficiency of self activated phosphors as a blue phosphor and $Eu^{3+}$ activated phosphors as a red phosphor even under excitation by not only long wave ultraviolet line (wavelength: 200–400 nm) but also vacuum ultraviolet line (wavelength: 200 nm or less), to provide a display system containing such phosphors, and to provide a light emitting system containing such phosphors.

The present invention provides a rare earth phospho-vanadate phosphor comprising phosphorus oxide and vanadate such as vanadium oxide, said phosphor having a diffraction intensity ratio of the (2, 0, 0) plane to the (1, 1, 2) plane of less than 6.9 in a powder X-ray diffraction pattern.

The present invention also provides a rare earth phospho-vanadate phosphor comprising phosphorus oxide and vanadate such as vanadium oxide, said phosphor being powder particle with an average ratio of long side length to short side length in rectangle of 1.0 to 6.0.

The present invention further provides a rare earth phospho-vanadate phosphor comprising phosphorus oxide and vanadate such as vanadium oxide, and further comprising at least one element in Group IV of the periodic table intentionally added.

The present invention still further provides a display system such as a plasma display apparatus comprising a plasma display panel containing a luminescent layer including as a constituting material the rare earth phospho-vandate phosphor mentioned above.

The present invention also provides a light emitting system such as a rare gas discharge luminescent lamp, a deluxe luminescent lamp using a mixture of blue, green and red phosphors, using the rare earth phospho-vanadate phosphor mentioned above.

BRIEF DESCRIPTION OF THE DRAWINGS

FIG. 4 is a perspective view of AC PDP cell constituting a plasma display panel.

DETAILED DESCRIPTION OF THE INVENTION

Figure 1:
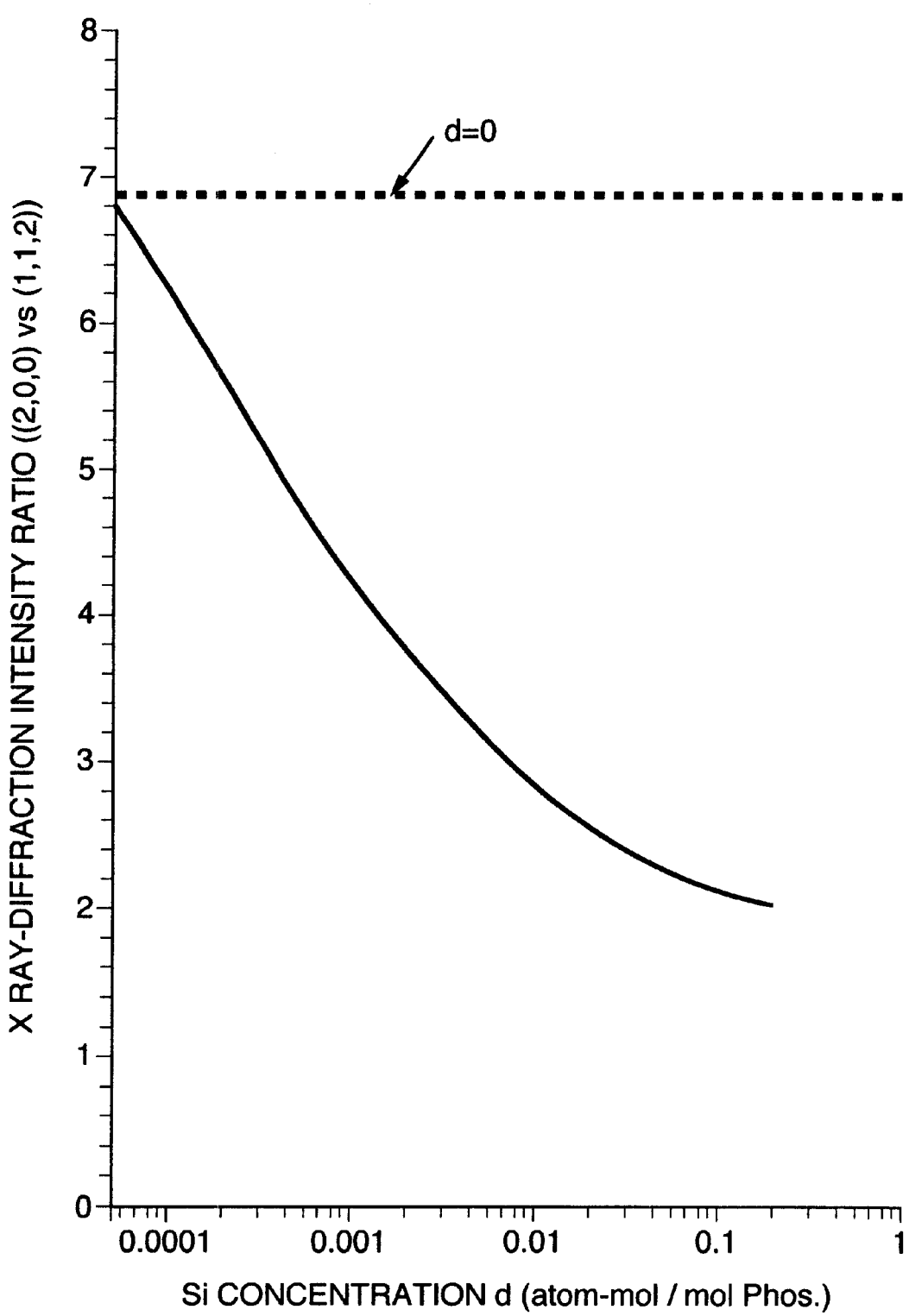
FIG. 1 is a graph showing dependency of the diffraction intensity ratio of the (2, 0, 0) plane to the (1, 1, 2) plane of a phosphor on the Si concentration (d) in a powder diffraction pattern, wherein the phosphor has a composition equation of $Y_{0.70}Gd_{0.15}Eu_{0.15}(P_{0.65}V_{0.35})O_4 \cdot (SiO_2)_d$.

The present inventors have studied how to control the shape and to improve brightness of the phospho-vanadate phosphors containing rare earth elements as major components previously proposed, and found that when at least one kind of element selected from elements of Group IV of periodic table in a suitable amount was added to the phosphors, the object has been attained.

That is, when such an element was not contained in the phosphors, the phosphor particles had a shape of a square pillar having an extremely long side. But when such an element was contained in the phosphors, it was possible to obtain cubic powders. Further, the brightness of the resulting phosphors were also improved. In addition, when such phosphors were used in a display system such as a plasma display apparatus, and a light emitting system such as a fluorescent lamp as blue and red phosphor components, it was possible to obtain the systems having a higher brightness and a longer brightness life. Thus, the present invention has been accomplished.

The phosphor of the present invention can be represented by the formula:

$$Ln(P_cV_{1-c})O_4 \cdot (MO_2)_d \qquad (1)$$

wherein Ln is at least one element selected from rare earth elements of Y, Sc and elements of atomic numbers 57 to 71 (La, Ce, Pr, Nd, Pm, Sm, Eu, Gd, Tb, Dy, Ho, Er, Tm, Yb, and Lu), or at least one element selected from elements of Group IIIb (B, Al, Ga, In, and Tl); M is at least one element selected from elements of Group IV; and d is a number of 0<d<0.0814.

Among the phosphors of the formula (1), those of the following formulae (2) and (3) are more preferable from the viewpoint of practical use:

$$(Y_{1-a}Gd_a)(P_cV_{1-c})O_4 \cdot (MO_2)_d \quad (2)$$

wherein M is at least one element selected from Si, Ge and Ti; and a, c, and d are numbers in the following ranges:
$0 < a \leq 0.90$, $0 < c \leq 0.95$, and $0.0014 < d \leq 0.0814$, $$(Y_{1-a-b}Gd_aEU_b)(P_cV_{1-c})O_4 \cdot (MO_2)_d \quad (3)$$

wherein M is at least one element selected from Si, Ge and Ti; and a, b, c and d are numbers in the following ranges:
$0 < a \leq 0.90$, $0.03 < b \leq 0.60$, $0 < c \leq 0.95$, and $0.0014 < d \leq 0.0814$.

The above-mentioned phosphors are used as a luminescent layer in a display system such as a plasma display, a field emission display, etc., and a light emission system such as a rare gas discharge luminescent lamp, a deluxe luminescent lamp using a mixture of blue, green and red phosphors, etc.

Figure 2:
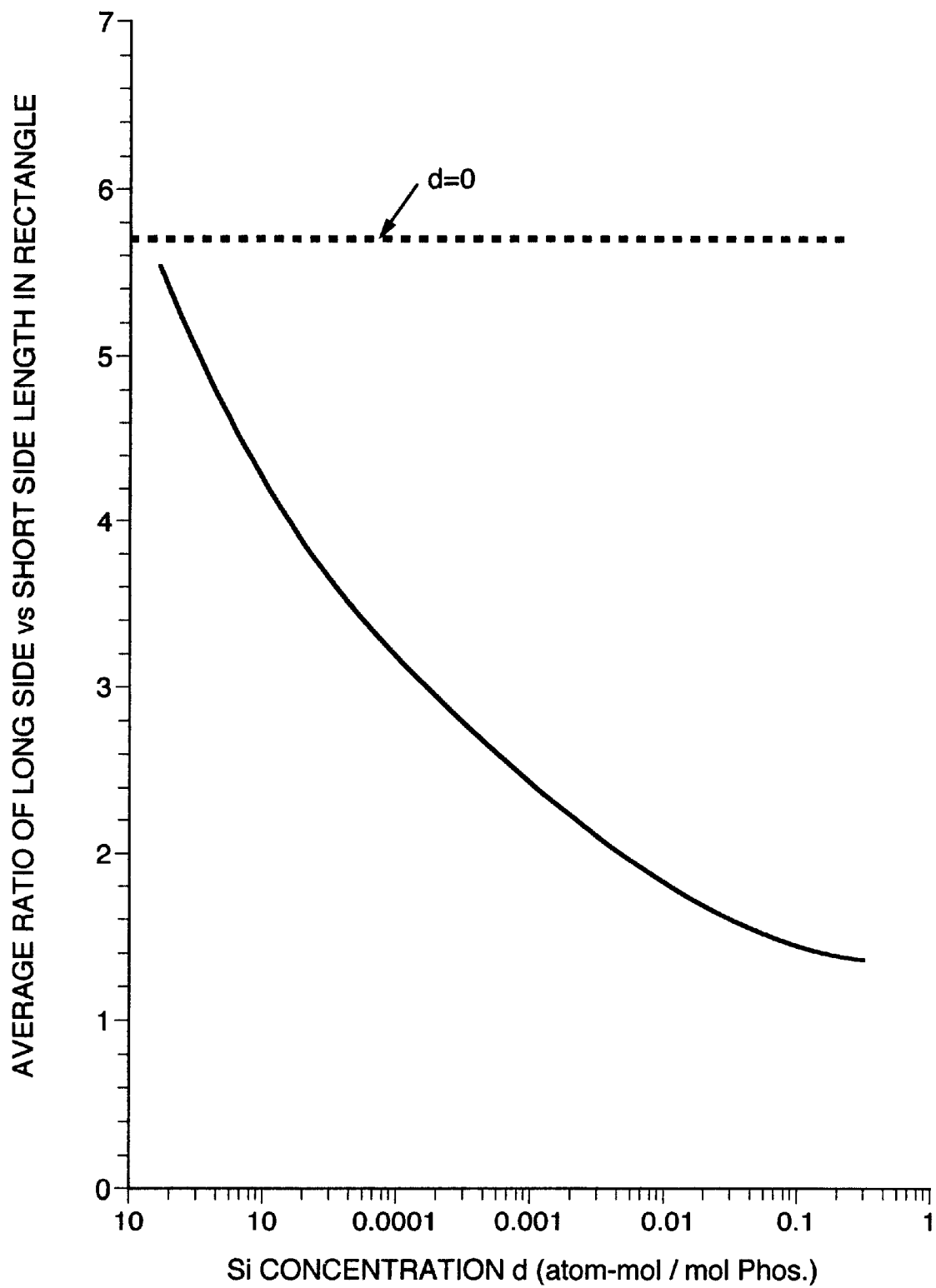
FIG. 2 is a graph showing dependency of the average ratio of long side length to short side length in rectangle of a phosphor particle on the Si concentration (d), wherein the phosphor has a composition equation of $Y_{0.70}Gd_{0.15}Eu_{0.15}(P_{0.65}V_{0.35})O_4 \cdot (SiO_2)_d$.
Figure 3:
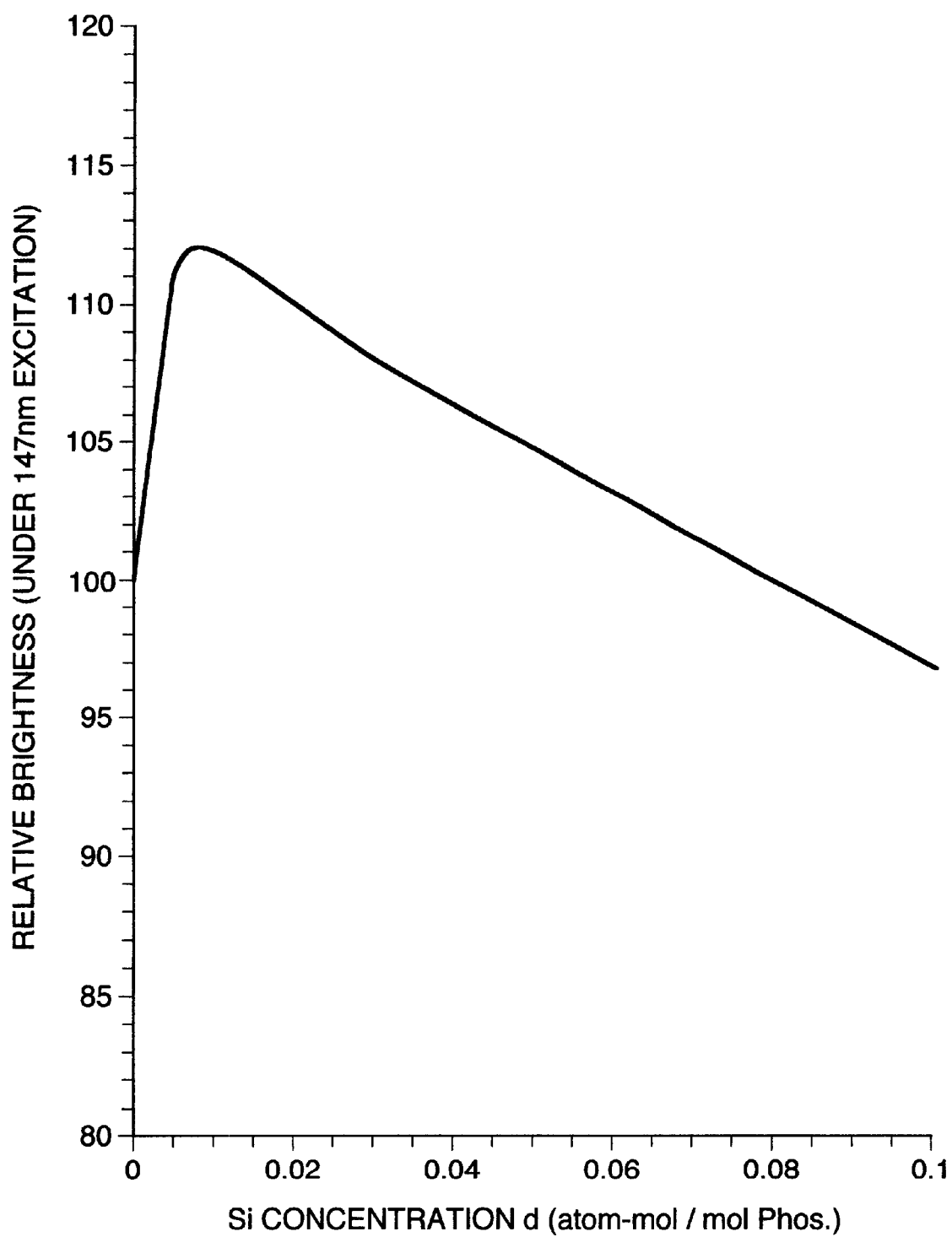
FIG. 3 is a graph showing dependency of the relative brightness of a phosphor under xenon resonance line excitation at 147 nm, wherein the phosphor has a composition equation of $Y_{0.70}Gd_{0.15}Eu_{0.15}(P_{0.65}V_{0.35})O_4 \cdot (SiO_2)_d$.

Properties of the phosphors of the present invention are, for example, shown in FIGS. 1 to 3, wherein the concentration of Si in samples is a value obtained by subtracting Si contained as an impurity in raw materials.

FIG. 1 is a graph showing a relationship between the diffraction intensity ratio of the (2, 0, 0) plane to the (1, 1, 2) plane of a phosphor and Si concentrations (d) in a powder X-ray pattern, wherein the phosphor has a composition equation of $Y_{0.70}Gd_{0.15}Eu_{0.15}(P_{0.65}V_{0.35})O_4 \cdot (SiO_2)_d$.

With an increase of the Si concentration, the diffraction intensity at the (2, 0 0) plane parallel to the c axis becomes weak, while the diffraction intensity at the (1, 1, 2) plane not parallel to the c axis becomes strong, resulting in showing a tendency to remarkably decrease the intensity ratio at both planes. This means that a plane not parallel to the c axis grows.

FIG. 2 shows dependency of the average ratio of long side length to short side length in rectangle of a phosphor particle on the Si concentration, wherein the phosphor has a composition equation of $Y_{0.70}Gd_{0.15}Eu_{0.15}(P_{0.65}V_{0.35})O_4 \cdot (SiO_2)_d$.

With an increase of the Si concentration, the average ratio of long side length to short side length in rectangle remarkably reduces. By the introduction of Si, it is possible to change the shape of the phosphor from a square pillar or needle to a cubic shape.

Here the long side length and the short side length of the powder particles of phosphor was obtained from SEM (scanning electron microscope) photographs.

Samples are prepared as follows. On a sample holder made of copper and covered on only the upper side with an adhesive carbon sheet, phosphor powders well dispersed are powdered and coated, followed by blowing compressed air to prepare 1 to 5 layers of phosphor layers. Then, vapor deposition of gold is conducted thereupon to obtain the sample. The magnification of SEM photograph changes depending on the size of sample phosphors. A suitable magnification is to contain about 20 particles in a sheet of photograph (a practical image size of 82×118 mm). The long side length and short side length of about 100 particles are measured for 1 sample (about 5 sheets of photograph).

FIG. 3 is a graph showing a relationship between the relative brightness of a phosphor under xenon resonance line excitation at 147 nm and the Si concentration, wherein the phosphor has a composition equation of $Y_{0.70}Gd_{0.15}Eu_{0.15}(P_{0.65}V_{0.35})O_4 \cdot (SiO_2)_d$. As show in FIG. 3, it is possible to obtain phosphors having a higher brightness in the Si concentration range of $0 < d < 0.08$ compared with the case of.containing no Si.

FIG. 4 shows one example of a structure of an AC PDP cell constituting a plasma display panel of the present invention. The phosphors are excited by ultraviolet light (147, 173 nm) emitted by xenon gas plasma discharge in the cell to emit red, green and blue fluorescence.

Typical examples of the phosphors of the present invention can be prepared as follows.

Raw Reagents for Phosphors

Yttrium compounds such as yttrium oxide, yttrium phosphate, etc.

Gadolinium compounds such as gadolinium oxide, gadolinium phosphate, etc.

Europium compounds such as europium oxide, europium nitrate, europium phosphate, etc.

Other rare earth oxides and oxides of elements of Group III of periodic table

Phosphorus compounds such as ammonium dihydrogen-, hydrogen-, or ortho-phosphate, etc.

Vanadium compounds such as vanadium pentoxide, ammonium vanadate, etc.

Sodium compounds such as sodium carbonate, etc.

Silicon compounds such as silicon dioxide, etc.

Germanium compounds such as germanium dioxide, etc.

Titanium compounds such as titanium oxide, etc.

Zirconium compounds such as zirconium oxide, etc.

Hafnium compounds such as hafnium oxide, etc.

Tin compounds such as tin oxide, etc.

The above-mentioned raw materials are weighed according to a composition equation, and mixed well by a wet- or dry mixing method. As the rare earth element material, it is possible to use a co-precipitated material. The resulting mixture is charged in a heat resistant vessel such as a high purity alumina crucible and fired in a neutral atmosphere or an oxidizing atmosphere such as air, etc. at 1000° to 1600° C. The fired product is crushed and sieved, washed by using an alkaline aqueous solution (depending on the kind of flux, it is possible to use an acidic aqueous solution together), washed with water and dried to give the desired phosphors of the present invention.

The present invention is illustrated by way of the following Examples, but not limited thereto.

EXAMPLE 1

Formulated compositions for synthesizing Sample Nos. 1 to 5 are shown in Table 1.

TABLE 1

| Sample No. | Formulated composition for phosphor |
| --- | --- |
| 1 | $Y_{0.7}Gd_{0.15}Eu_{0.15}(P_{0.65}V_{0.35})O_4 \cdot (SiO_2)_{0.005}$ |
| 2 | $Y_{0.7}Gd_{0.15}Eu_{0.15}(P_{0.65}V_{0.35})O_4 \cdot (SiO_2)_{0.01}$ |
| 3 | $Y_{0.7}Gd_{0.15}Eu_{0.15}(P_{0.65}V_{0.35})O_4 \cdot (SiO_2)_{0.02}$ |
| 4 | $Y_{0.7}Gd_{0.15}Eu_{0.15}(P_{0.65}V_{0.35})O_4 \cdot (SiO_2)_{0.05}$ |
| 5 | $Y_{0.7}Gd_{0.15}Eu_{0.15}(P_{0.65}V_{0.35})O_4 \cdot (SiO_2)_{0.25}$ |

Using raw reagents corresponding to the formulated compositions shown in Table 1, phosphors were synthesized by the process mentioned above. Compositions of the resulting phosphors were analyzed and shown Table 2.

TABLE 2

| Sample No. | Composition of phosphor |
| --- | --- |
| 1 | $Y_{0.7}Gd_{0.15}Eu_{0.15}(P_{0.65}V_{0.35})O_4 \cdot (SiO_2)_{0.0007}$ |
| 2 | $Y_{0.7}Gd_{0.15}Eu_{0.15}(P_{0.65}V_{0.35})O_4 \cdot (SiO_2)_{0.004}$ |
| 3 | $Y_{0.7}Gd_{0.15}Eu_{0.15}(P_{0.65}V_{0.35})O_4 \cdot (SiO_2)_{0.008}$ |
| 4 | $Y_{0.7}Gd_{0.15}Eu_{0.15}(P_{0.65}V_{0.35})O_4 \cdot (SiO_2)_{0.032}$ |
| 5 | $Y_{0.7}Gd_{0.15}Eu_{0.15}(P_{0.65}V_{0.35})O_4 \cdot (SiO_2)_{0.16}$ |
| Reference Sample 1 | $Y_{0.7}Gd_{0.15}Eu_{0.15}(P_{0.65}V_{0.35})O_4$ |

The Group IV element to be contained is Si and $Eu^{3+}$ ion is included as a luminescent center to give a phosphor emitting a red color.

As is clear from Tables 1 and 2, Si added is partly lost during the synthesis process. As a result, about 14 to 65% of the Si added is; included in the phosphor. In addition, the Si concentration in the Samples shown in Tables 1 and 2 are the values obtained by subtracting Si contained as an impurity in the raw materials.

Synthesis of Sample No. 1 phosphor was conducted as follows. After mixing well the following raw reagents from the raw reagents mentioned above, the resulting mixture was charged in an alumina crucible and fired in the air at 1250° C. for 5 hours:

| Raw reagents | $YPO_4$ | 83.30 g | $Y_2O_3$ | 4.67 g |
| --- | --- | --- | --- | --- |
| | $Gd_2O_3$ | 16.31 g | $V_2O_5$ | 21.01 g |
| | $Eu_2O_3$ | 15.84 g | $Na_2CO_3$ | 2.26 g |
| | $SiO_2$ | 0.04 g | | |

The fired product was crushed, sieved, washed with an aqueous solution of 2 wt % $(NH_4)_2CO_3$, washed with water and dried to give the desired phosphor.

The resulting phosphor was subjected to measurement with powder X-ray diffraction pattern. The diffraction intensity ratio of the (2, 0, 0) plane to the (1, 1, 2) plane was 3.9. This value is remarkably small compared with the value of 6.9 of the phosphor of Reference Example 1 not adding Si $[Y_{0.70}Gd_{0.15}Eu_{0.15}{-}(P_{0.65}V_{0.35})O_4]$.

In the same manner as mentioned above, the diffraction intensity ratios of Samples 2, 3, 4 and 5 were measured and plotted in FIG. 1 against the Si concentrations. As is clear from FIG. 1, the diffraction intensity ratio of the (2, 0, 0) plane to the (1, 1, 2) plane is reduced with an increase of the Si concentration. This means a decrease of the plane parallel to the c axis, that is the (2, 0, 0) plane, in other words, the shape of phosphor particle becomes cubic.

Next, as is clear from FIG. 2 which shows dependency of the average ratio of long side length to short side length in rectangle of a phosphor particle on the Si concentration, said phosphor having a composition of $Y_{0.70}Gd_{0.15}Eu_{0.15}(P_{0.65}V_{0.35})O_4 \cdot (SiO_2)_d$, with an increase of the Si concentration (d), the average ratio of long side length to short side length remarkably decreases conversely. The shape of the phosphor particles changes from a square pillar or needle to a cubic body depending on the Si content, resulting in providing suitable particle shape for forming a higher density phosphor layer.

Further, FIG. 3 shows dependency of the relative brightness of a phosphor under xenon resonance line excitation at 147 nm on the Si concentration (d). The brightness is improved by the Si content, and effective range of Si is 0<d<0.08. The value of d in the range of 0<d<0.08 is obtained by subtracting Si amount contained as an impurity in a sample not adding $SiO_2$ as mentioned above. The Si amount in the sample not adding $SiO_2$ was 0.0014 atom-mol in a phosphor previously obtained by analysis. Therefore, the Si amount in a practical sample is larger than 0.0014 and less than 0.0814.

EXAMPLE 2

Using the raw reagents mentioned above, Sample Nos. 6 and 7 were synthesized from the formulated compositions shown in Table 3 in the same manner as in Example 1. The contents of the Group IV elements in the Samples are those obtained by subtracting Group IV elements contained as impurity in raw materials.

TABLE 3

| Sample No. | Formulated composition for phosphor |
| --- | --- |
| 6 | $Y_{0.7}Gd_{0.15}Eu_{0.15}(P_{0.65}V_{0.35})O_4 \cdot (GeO_2)_{0.02}$ |
| 7 | $Y_{0.7}Gd_{0.15}Eu_{0.15}(P_{0.65}V_{0.35})O_4 \cdot (TiO_2)_{0.02}$ |
| 8 | $Y_{0.7}Gd_{0.15}Eu_{0.15}(P_{0.65}V_{0.35})O_4 \cdot (ZrO_2)_{0.02}$ |
| 9 | $Y_{0.7}Gd_{0.15}Eu_{0.15}(P_{0.65}V_{0.35})O_4 \cdot (HfO_2)_{0.02}$ |
| 10 | $Y_{0.7}Gd_{0.15}Eu_{0.15}(P_{0.65}V_{0.35})O_4 \cdot (SnO_2)_{0.02}$ |
| Reference Sample 2 | $Y_{0.7}Gd_{0.15}Eu_{0.15}(P_{0.65}V_{0.35})O_4$ |

The average ratio of long side length to short side length in rectangle of Sample No. 6 (containing Ge) and that of Sample.No. 7 (containing Ti) were remarkably improved to 1.5 and 2.6, respectively, compared with the case of containing no Ge nor Ti, that is, Reference Sample 2 $[Y_{o.7}Gd_{0.15}Eu_{0.15}{-}(P_{0.65}V_{0.35})O_4]$ of 5.7. Further, the brightness of Sample No. 6 (containing Ge) under xenon resonance line (147 nm) excitation as high as 109% compared with Reference Sample 2.

EXAMPLE 3

Sample Nos. 8, 9 and 10 were synthesized by using the raw reagents mentioned above with the formulated compositions shown in Table 3 in the same manner as mentioned above.

The average ratios of long side length to short side length in rectangle of Sample Nos. 8, 9, and 10 containing Zr, Hf and Sn, respectively, were 5.4, 5.4 and 5.5, respectively, which values are better than 5.7 of the phosphor of Reference Sample 2 containing no Zr, Hf nor Sn $[Y_{0.7}Gd_{0.15}Eu_{0.15}(P_{0.65}V_{0.35})O_4]$. Thus, the controlling effect of particles was admitted.

EXAMPLE 4

Sample Nos. 11, 12 and 13 were synthesized by using the raw reagents mentioned above with the formulated compositions shown in Table 4 wherein $SiO_2$ was formulated in a constant amount (0.02 mol/mol) while changing the amount of Gd, in the same manner as mentioned above. The Si contents in the samples were the values obtained by subtracting Si contained as an impurity in raw materials.

The average ratios of long side length to short side length in rectangle of Sample Nos. 11, 12 and 13 were smaller than those of Reference Samples 3, 4 and 5 containing no Si. The Si contents in the samples were the values obtained by subtracting Si contained as an impurity in raw materials.

EXAMPLE 5

Sample Nos. 14, 15, 16, 17 and 18 were synthesized by using the raw reagents mentioned above with the formulated compositions shown in Table 4 wherein $SiO_2$ was formulated in a constant amount (0.02 mol/mol) while changing the amount of Eu.

The average ratios of long side length to short side length in rectangle of Sample Nos. 14 to 18 were smaller than those of Reference Samples 6 to 10 containing no Si. The Si contents in the samples were the values obtained by subtracting Si in raw materials.

TABLE 4

| Sample No. | Formulated composition for phosphor |
| --- | --- |
| 11 | $Y_{0.86}Gd_{0.10}Eu_{0.04}(P_{0.80}V_{0.20})O_4 \cdot (SiO_2)_{0.02}$ |
| Reference Sample 3 | $Y_{0.86}Gd_{0.10}Eu_{0.04}(P_{0.80}V_{0.20})O_4$ |
| 12 | $Y_{0.76}Gd_{0.20}Eu_{0.04}(P_{0.80}V_{0.20})O_4 \cdot (SiO_2)_{0.02}$ |
| Reference Sample 4 | $Y_{0.76}Gd_{0.20}Eu_{0.04}(P_{0.80}V_{0.20})O_4$ |
| 13 | $Y_{0.46}Gd_{0.50}Eu_{0.04}(P_{0.80}V_{0.20})O_4 \cdot (SiO_2)_{0.02}$ |
| Reference Sample 5 | $Y_{0.46}Gd_{0.50}Eu_{0.04}(P_{0.80}V_{0.20})O_4$ |
| 14 | $Y_{0.48}Gd_{0.48}Eu_{0.04}(P_{0.65}V_{0.35})O_4 \cdot (SiO_2)_{0.02}$ |
| Reference Sample 6 | $Y_{0.48}Gd_{0.48}Eu_{0.04}(P_{0.65}V_{0.35})O_4$ |
| 15 | $Y_{0.45}Gd_{0.45}Eu_{0.10}(P_{0.65}V_{0.35})O_4 \cdot (SiO_2)_{0.02}$ |
| Reference Sample 7 | $Y_{0.45}Gd_{0.45}Eu_{0.10}(P_{0.65}V_{0.35})O_4$ |
| 16 | $Y_{0.425}Gd_{0.425}Eu_{0.15}(P_{0.65}V_{0.35})O_4 \cdot (SiO_2)_{0.02}$ |
| Reference Sample 8 | $Y_{0.425}Gd_{0.425}Eu_{0.15}(P_{0.65}V_{0.35})O_4$ |
| 17 | $Y_{0.35}Gd_{0.35}Eu_{0.30}(P_{0.65}V_{0.35})O_4 \cdot (SiO_2)_{0.02}$ |
| Reference Sample 9 | $Y_{0.35}Gd_{0.35}Eu_{0.30}(P_{0.65}V_{0.35})O_4$ |
| 18 | $Y_{0.25}Gd_{0.25}Eu_{0.50}(P_{0.65}V_{0.35})O_4 \cdot (SiO_2)_{0.02}$ |
| Reference Sample 10 | $Y_{0.25}Gd_{0.25}Eu_{0.50}(P_{0.65}V_{0.35})O_4$ |
| 19 | $Y_{0.46}Gd_{0.50}Eu_{0.04}(P_{0.20}V_{0.80})O_4 \cdot (SiO_2)_{0.02}$ |
| Reference Sample 11 | $Y_{0.46}Gd_{0.50}Eu_{0.04}(P_{0.20}V_{0.80})O_4$ |
| 20 | $Y_{0.46}Gd_{0.50}Eu_{0.04}(P_{0.40}V_{0.60})O_4 \cdot (SiO_2)_{0.02}$ |
| Reference Sample 12 | $Y_{0.46}Gd_{0.50}Eu_{0.04}(P_{0.40}V_{0.60})O_4$ |
| 21 | $Y_{0.46}Gd_{0.50}Eu_{0.04}(P_{0.60}V_{0.40})O_4 \cdot (SiO_2)_{0.02}$ |
| Reference Sample 13 | $Y_{0.46}Gd_{0.50}Eu_{0.04}(P_{0.60}V_{0.40})O_4$ |
| 22 | $Y_{0.46}Gd_{0.50}Eu_{0.04}(P_{0.80}V_{0.20})O_4 \cdot (SiO_2)_{0.02}$ |
| Reference Sample 14 | $Y_{0.46}Gd_{0.50}Eu_{0.04}(P_{0.80}V_{0.20})O_4$ |

EXAMPLE 6

Sample Nos. 19, 20, 20 and 22 were synthesized by using the raw reagents mentioned above with the formulated compositions shown in Table 4 wherein $SiO_2$ was formulated in a constant amount (0.02 mol/mol) while changing only the molar ratio of P, in the same manner as mentioned above.

The average ratios of long side length to short side length in rectangle of Sample Nos. 19 to 22 were smaller than those of Reference Samples 11 to 14 containing no Si.

EXAMPLE 7

The formulated composition for phosphor is shown in Table 5. Sample No. 23 in Table 5 contains Si as the Group IV element, $VO_4^{3-}$ as the luminescent center, and thus is a phosphor emitting blue color. The Si content in the sample is a value obtained by subtracting Si contained as an impurity in raw material.

TABLE 5

| Sample No. | Formulated composition of phosphor |
| --- | --- |
| 23 | $Y_{0.90}Gd_{0.10}(P_{0.85}V_{0.15})O_4 \cdot (SiO_2)_{0.05}$ |
| Reference Sample 15 | $Y_{0.90}Gd_{0.10}(P_{0.85}V_{0.15})O_4$ |

Sample No. 23 which is a self activated blue phosphor having the composition of $Y_{0.90}Gd_{0.10}(P_{0.85}V_{0.15})$—$O_4 \cdot (SiO_2)_{0.05}$ was synthesized by using the raw reagents mentioned above and the same synthesis process mentioned above.

The average ratio of long side length to short side length in rectangle of Sample 23 was 1.4, which value was smaller than 2.9 of Reference Sample 15 containing no Si. As mentioned above, by containing Si, the particle shape of the phosphor was able to be cubic.

EXAMPLE 8

A plasma display panel including AC PDP cell shown in FIG. 4 was prepared by using $Eu^{2+}$ activated Ba, Mg aluminate phosphor as a blue phosphor constituting a blue phosphor layer, $Mn_{2+}$ activated Zn silicate phosphor as a green phosphor constituting a green phosphor layer, and Sample No. 3 $[Y_{0.70}Gd_{0.15}Eu_{0.15}(P_{0.65}V_{0.35})$—$O_4 \cdot (SiO_2)_{0.008}]$ as a red phosphor constituting a red phosphor layer.

This panel was improved in red brightness compared with a conventional panel produced by changing only a red phosphor constituting a red phosphor layer to $Eu^{3+}$ activated Y,Gd borate, and had a relative color difference value of as small as 28% from NTSC standard red point in the linear chromaticity coordinate (U,V) of emitted colors with good color purity and wide color reproduction range.

EXAMPLE 9

A plasma display panel was produced by using as a blue phosphor constituting a blue phosphor layer Sample No. 23 $[Y_{0.90}Gd_{0.10}(P_{0.85}V_{0.15})O_4 \cdot (SiO_2)_{0.05}]$, as a green phosphor constituting a green phosphor layer $Mn^{2+}$, activated Zn silicate phosphor, and as a red phosphor constituting a red phosphor layer Eu3+ activated Y,Gd borate.

This panel had 170% in blue brightness compared with a conventional panel produced by changing only a blue phosphor constituting a blue phosphor layer to $Eu^{2+}$ activated Ba, Mg aluminated phosphor, and was improved remarkably in the brightness life.

EXAMPLE 10

On inner side of a glass substrate, a uniform transparent electrode was formed. On the transparent electrode, a blue phosphor layer containing as a blue phosphor Sample No. 23 $[Y_{0.90}Gd_{0.10}(P_{0.85}V_{0.15})O_4 \cdot (SiO_2)_{0.05}]$, a green phosphor layer containing as a green phosphor $Mn^{2+}$, activated Zn silicate phosphor, and a red phosphor layer containing as a red phosphor.Sample No. 3 $[[Y_{0.70}Gd_{0.15}Eu_{0.15}(P_{0.65}V_{0.35})O_4 \cdot (SiO_2)_{0.008}]$ were formed in this order. Another glass substrate having a minute electron beam source therein was piled on the resulting glass substrate, followed by sealing and exhaust to vacuum to produce a panel of 10 type field emission type display (FED). This panel had higher brightness than a conventional FED panel and was improved in brightness life.

EXAMPLE 11

A rare gas discharge luminescent lamp was produced by using as a blue phosphor Sample No. 23 $[Y_{0.90}Gd_{0.10}(P_{0.85}V_{0.15})O_4 \cdot (SiO_2)_{0.05}]$, as a green phosphor $Mn^{3+}$ activated Zn silicate phosphor, and as a red phosphor $Eu^{3+}$ activated Y, Gd borate phosphor. This lamp had higher brightness compared with a conventional rare gas discharge luminescent lamp produced by only changing a blue phosphor to $Eu^{2+}$ activated Ba, Mg aluminate phosphor, and was improved in brightness life.

EXAMPLE 12

A deluxe luminescent lamp using a mixture of blue, green and red phosphors was produced by using as a blue phosphor Sample No. 23 $[Y_{0.90}Gd_{0.10}(P_{0.85}V_{0.15})$—$O_4 \cdot (SiO_2)_{0.05}]$, as a green phosphor $Ce^{3+},Tb^{3+}$ co-activated La phosphate phosphor, and as a red phosphor Eu³⁺, activated Y, Gd oxide phosphor. This lamp had higher brightness compared with a conventional lamp produced by only changing a blue phosphor to Eu²⁺ activated Ba, Mg aluminate phosphor, and was improved in brightness life.

As the blue phosphors and the red phosphors, not only the Samples used in Examples 9 to 12 but also other phosphors can be used singly or in combination.

According to the present invention, it is possible to provide display systems and light emitting systems having higher brightness and improved brightness life.

What is claimed is:

1. A rare earth phospho-vanadate phosphor having a diffraction intensity ratio of the (2, 0, 0) plane to the (1, 1, 2) plane of less than 6.9 in a powder X-ray diffraction pattern.

2. A rare earth phospho-vanadate phosphor wherein a phosphor powder particle has an average ratio of long side length to short side length in rectangle of 1.0 to 6.0.

3. A phosphor according to claim 1, which further comprises at least one element in Group IV of the periodic table.

4. A phosphor according to claim 3, wherein the element in Group IV of the periodic table is Si, Ge or Ti.

5. A rare earth phospho-vanadate phosphor according to claim 4, which further comprises at least one element in Group IV of the periodic table, wherein the element in Group IV of the periodic table is Si, Ge or Ti, and wherein the concentration of Si, Ge or Ti is larger than 0.0014 atom-mol/mol and less than 0.0814 atom-mol/mol.

6. A phosphor according to claim 4, which further comprises at least one element selected from the group consisting of rare earth elements of Y, Sc, and atomic numbers of from 57 to 71 and the elements in Group IIIb of the periodic table.

7. A rare earth phospho-vanadate phosphor according to claim 6, which further comprises at least one element in Group IV of the periodic table, wherein the element in Group IV of the periodic table is Si, Ge or Ti, which further comprises at lest one element selected from the group consisting of rare earth elements of Y, Sc, and atomic numbers of from 57 to 71 and the elements in Group IIIb of the periodic table, wherein the rare earth element is Y and Gd, and the phosphor includes VO43− ion as a luminescent center, emits a blue color, and is represented by the following composition equation:

(Y1−aGda)(PcV1−c)O4.(MO2)d

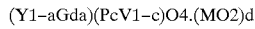

wherein M is at least one element selected from the group consisting of Si, Ge, and Ti; and a, c and d are numbers in the following ranges:

0<a≦0.90, 0<c≦0.95 and 0.0014<d<0.0814.

8. A rare earth phospho-vanadate phosphor according to claim 6, which further comprises at least one element in Group IV of the periodic table, wherein the element in Group IV of the periodic table is Si, Ge or Ti, which further comprises at lest one element selected from the group consisting of rare earth elements of Y, Sc, and atomic numbers of from 57 to 71 and the elements in Group IIIb of the periodic table, wherein the rare earth element is Y and Gd, and the phosphor includes Eu3+ ion as a luminescent center, emits a red color and is represented by the following composition equation:

(Y1−a−bGdaEub)(PcV1−c)O4.(MO2)d

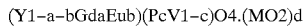

wherein M is at least one element selected from the group consisting of Si, Ge and TI; and a, b, c and d are numbers in the following ranges:

0<a≦0.90, 0.03≦b≦0.60, 0<c≦0.95 and 0.0014<d≦0.0814.

9. A plasma display apparatus comprising a plasma display panel containing a luminescent layer including as a constituting material the rare earth phospho-vanadate phosphor of claim 1.

10. A plasma display apparatus comprising a plasma display panel containing a luminescent layer including as a constituting material the rare earth phospho-vanadate phosphor of claim 2.

11. A plasma display apparatus comprising a plasma display panel containing a luminescent layer including as a constituting material the rare earth phospho-vanadate phosphor of claim 3.

12. A plasma display apparatus comprising a plasma display panel containing a luminescent layer including as a constituting material the rare earth phospho-vanadate phosphor of claim 4.

13. A plasma display apparatus comprising a plasma display panel containing a luminescent layer including as a constituting material the rare earth phospho-vanadate phosphor of claim 5.

14. A plasma display apparatus comprising a plasma display panel containing a luminescent layer including as a constituting material the rare earth phospho-vanadate phosphor of claim 6.

15. A plasma display apparatus comprising a plasma display panel containing a luminescent layer including as a constituting material the rare earth phospho-vanadate phosphor of claim 7.

16. A plasma display apparatus comprising a plasma display panel containing a luminescent layer including as a constituting material the rare earth phospho-vanadate phosphor of claim 8.

17. A display system comprising a luminescent layer including as a constituting material the rare earth phospho-vanadate phosphor of claim 2, and an electron beam source for emitting electron beams for exciting the luminescent layer.

18. A light emitting system comprising a luminescent layer including as a constituting material the rare earth phospho-vanadate phosphor of claim 2.

19. A light emitting system according to claim 18, wherein the light emitting system is a rare gas discharge luminescent lamp.

20. A light emitting system according to claim 18, wherein the light emitting system is a deluxe luminescent lamp using a mixture of blue, green and red phosphors.

* * * * *